United States Patent
Gural et al.

(10) Patent No.: US 11,586,908 B1
(45) Date of Patent: Feb. 21, 2023

(54) SYSTEM AND METHOD FOR IMPLEMENTING NEURAL NETWORKS IN INTEGRATED CIRCUITS

(71) Applicant: Xilinx, Inc., San Jose, CA (US)

(72) Inventors: Albert T. Gural, Clifton, VA (US); Sambhav R. Jain, Santa Clara, CA (US); Christopher H. Dick, San Jose, CA (US)

(73) Assignee: XILINX, INC., San Jose, CA (US)

( * ) Notice: Subject to any disclaimer, the term of this patent is extended or adjusted under 35 U.S.C. 154(b) by 955 days.

(21) Appl. No.: 16/295,405

(22) Filed: Mar. 7, 2019

(51) Int. Cl.
G06N 3/08 (2006.01)
G06K 9/62 (2022.01)
G06N 3/04 (2023.01)
G06F 40/20 (2020.01)

(52) U.S. Cl.
CPC ............. *G06N 3/08* (2013.01); *G06F 40/20* (2020.01); *G06K 9/6267* (2013.01); *G06N 3/0481* (2013.01)

(58) Field of Classification Search
CPC ........ G06N 3/08; G06N 3/0481; G06F 40/20; G06K 9/6267
See application file for complete search history.

(56) References Cited

U.S. PATENT DOCUMENTS

2019/0041419 A1\* 2/2019 Abuella .................... G01P 3/36
2019/0050710 A1\* 2/2019 Wang ...................... G06N 3/04
2021/0192349 A1\* 6/2021 Lian ......................... G06N 3/04

OTHER PUBLICATIONS

Miyashita et al. ("Convolutional Neural Networks using Logarithmic Data Representation", https://arxiv.org/abs/1603.01025, 2016) (Year: 2016).\*
Benoit, Jacob et al., "Quantization and Training of Neural Networks for Efficient Integer-Arithmetic-Only Inference," https://arxiv.org/abs/1712.05877, Dec. 15, 2017, pp. 1-14, Cornell University, Ithaca, New York, USA.
Bengio, Yoshua et al., "Estimating or Propagating Gradients Through Stochastic Neurons for Conditional Computation," https://arxiv.org/abs/1308.3432. Aug. 15, 2013, pp. 1-12, Cornell University, Ithaca, New York, USA.

\* cited by examiner

*Primary Examiner* — Qian Yang
(74) *Attorney, Agent, or Firm* — Patterson + Sheridan, LLP (57) ABSTRACT

Systems and methods for training a neural network model includes providing a quantization function including a quantization log threshold parameter associated with a log value of a quantization threshold. A quantization training to a neural network model is performed to generate quantized neural network parameters. The quantization training includes: generating first values with a first precision for the neural network parameters; performing a first optimization process to generate an updated quantization log threshold parameter; and generating quantized values with a second precision lower than the first precision for the neural network parameters by applying the quantization function with the updated quantization log threshold parameter to the first values. The neural network model with the quantized values for the neural network parameters is provided for performing a task.

20 Claims, 8 Drawing Sheets

| | 514 | 516 | 518 |
|---|---|---|---|
| quantization log threshold logt 502 | log2(24) | log2(45) | log2(11) |
| quantization scale factor s 504 | $(2^5)/8 = 4$ | $(2^6)/8 = 8$ | $(2^4)/8 = 2$ |
| x/s 506 | [-8, 4.06364, 3.24975, 0.4135] | [-4, 2.03182, 1.624875, 0.20675] | [-16, 8.12728, 6.4995, 0.827] |
| round(x/s) 508 | [-8, 4, 3, 0] | [-4, 2, 2, 0] | [-16, 8, 6, 1] |
| clip(round(x/s), -n/2, n/2-1) 510 | [-8, 4, 3, 0] | [-4, 2, 2, 0] | [-8, 7, 6, 1] |
| q(x;s) = s*clip(....) 512 | [-32, 16, 12, 0] | [-32, 16, 16, 0] | [-16, 14, 12, 2] |

SYSTEM AND METHOD FOR IMPLEMENTING NEURAL NETWORKS IN INTEGRATED CIRCUITS

TECHNICAL FIELD

Examples of the present disclosure generally relate to integrated circuits ("ICs") and, in particular, to neural networks in ICs.

BACKGROUND

Machine learning capabilities are fast evolving. For example, neural networks (NNs) may be used in both data centers and embedded applications. As the size of a Deep Neural Networks (DNN) continues to grow to improve the prediction capabilities, its memory and computational footprints also increase, which makes the DNN more difficult to deploy in a constrained hardware environment in ICs. One method to reduce these footprints is to use a smaller number of bits to represent weights and activations in a neural network, which is referred to as quantization. In particular, Quantized Neural Networks (QNN) (e.g., Binarized Neural Networks (BNNs), Ternary Neural Networks (TNNs), etc.) represent weights and activations in DNNs with low precision (e.g., binary/ternary) number representations. This may significantly reduce the computational, spatial, and memory complexity for specialized hardware implementations for the DNN. However, QNNs often incur significant accuracy drops from their full precision counterparts for challenging datasets.

Accordingly, it would be desirable and useful to provide an improved way of implementing DNNs.

SUMMARY

In some embodiments, a system includes a non-transitory memory and one or more hardware processors coupled to the non-transitory memory and configured to read instructions from the non-transitory memory to cause the system to perform operations. The operations include providing a quantization function including a quantization log threshold parameter associated with a log value of a quantization threshold. A quantization training to a neural network model is performed. The quantization training includes performing a first optimization process to generate an updated quantization log threshold parameter; and generating quantized neural network parameters for the neural network model based on the quantization function with the updated quantization log threshold parameter. The neural network model with the quantized neural network parameters is provided for performing a task.

In some embodiments, the first optimization process includes: using a gradient descent to generate the updated quantization log threshold parameter.

In some embodiments, the quantization training includes: performing a second optimization process to generate the quantized neural network parameters.

In some embodiments, the quantization training includes a plurality of iterations. During each iteration, the first optimization process and the second optimization are performed.

In some embodiments, the quantization training includes a plurality of iterations. The first optimization process is performed only in each of a first set of the plurality of iterations. The second optimization process is performed only in each of a second set of the plurality of iterations.

In some embodiments, the operations further comprise: performing a pre-calibration process to generate an initial calibrated value for the quantization log threshold parameter; and performing the first optimization process with the initial calibrated value for the quantization log threshold parameter.

In some embodiments, the pre-calibration process includes a constant initialization process, a calibration process that minimizes squared error between pre- and post-quantization, or a calibration process that minimizes Kullback-Leibler (KL) divergence between pre- and post-quantization.

In some embodiments, the operations include performing a float point training to the neural network model to train the neural network parameters prior to the quantization training.

In some embodiments, the performing the float point training includes: performing batch normalization by normalizing inputs of each layer of a plurality of layers of the neural network model.

In some embodiments, the task includes a natural language processing task or an image classification task.

In some embodiments, a method includes providing a quantization function including a quantization log threshold parameter associated with a log representation of a quantization threshold; performing a quantization training to a neural network model, and providing the neural network model with the quantized neural network parameters for performing a task. The quantization training includes: performing a first optimization process to generate an updated quantization log threshold parameter; and generating quantized neural network parameters based on the quantization function with the updated quantization log threshold parameter.

In some embodiments, the method includes performing a pre-calibration process to generate an initial calibrated value for the quantization log threshold parameter; and performing the first optimization process with the initial calibrated value for the quantization log threshold parameter.

In some embodiments, the method includes performing a float point training to the neural network model to train the neural network parameters prior to the quantization training.

Other aspects and features will be evident from reading the following detailed description and accompanying drawings.

DETAILED DESCRIPTION

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. An artificial neural network (also referred to as neural networks below) is a model of computation inspired by the structure of brain neural networks. The neural network includes an input layer, a plurality of hidden layers, and an output layer. Each layer may include one or more basic processing elements (PEs), also referred to as neurons. These layers and their neurons are connected to each other, through which the neural network may carry out highly complex computations. An activation (e.g., an output) of a particular neuron may be obtained by applying weights to the outputs of other neurons connected to that particular neuron, generating a weighted sum of the outputs of those other neurons, and apply an activation function to the weighted sum.

In various embodiments, the neural network learns to perform its given tasks. For example, the learning involves determining the value of the weights. This process is referred to as training the neural network. In some embodiments, a backpropagation learning method may be used. The backpropagation learning method includes two processes, a forward path (forward propagation) process, and a backward path (backward propagation) process. The backpropagation learning method may calculate the error contribution of each neuron after a batch of data (e.g., in image recognition, multiple images) is processed in the forward path, e.g., using high precision (e.g., real-value) and/or low precision (e.g. quantized) weights. A quantization function may be used to provide the correspondence between the bit representation of values (denoted q below, also referred to as a quantized value) and their interpretation as mathematical real numbers (denoted x below, also referred to as a real value). Such error contribution may be calculated as the gradients of a loss function, where the error is calculated at the output layer and distributed back through the network layers in the backward path. The weights may be updated using the gradients in the backward path.

In some embodiments, in the forward path, scaling coefficients are applied to the weighted sum to generate a scaled weighted sum, and that scaled weighted sum is then sent to the activation unit, where an activation function is applied to the scaled weighted sum to generate the activation. The scaling coefficients may be updated in the in the backward path. Such scaling coefficients may improve learning capabilities by providing greater model capacity and compensating for the information loss due to quantization (e.g., binary or ternary quantization) to the weights in the forward path.

Once trained, the neural network may perform its task (e.g., classification, detection, etc.) by computing the output of the neural network using the weights determined by the training process. This process may be referred to as the inference process. In some embodiments, once the training is complete, there is no need to keep the real-value weights, because at inference only forward propagation with the quantized weights is performed. As such, sometimes the forward path is also referred to as the inference path. The neural network may be used to perform various tasks, including for example, natural language processing tasks (e.g., machine translation, image captioning, language modeling, etc.) and image recognition and classification tasks based on low-level features (e.g. edges or pixel attributes for images).

As discussed above, while QNNs (e.g., BNNs and TNNs) may be used to reduce the computational, spatial, and memory complexity for specialized hardware implementations of DNN, they may incur significant accuracy drops from their full precision counterpart for challenging datasets.

It has been discovered that more optimal quantized neural network model parameters (e.g., quantized weights) may be achieved by performing a quantization training for training both weights and quantization parameters of a quantization function. Various advantages may be present in various applications of the present disclosure. No particular advantage is required for all embodiments, and different embodiments may offer different advantages. One advantage of some embodiments is that by using gradient descent, instead of an exponential moving average (EMA), to train quantization parameters, the number of training iterations is reduced. Additionally, such a training process allows the neural network to learn quantization parameters that directly improve a global cost function rather than minimizing a local error. Another advantage of some embodiments is that by training a quantization log threshold instead training directly the quantization threshold, the risk of runtime errors and training instability is eliminated. Yet another advantage of some embodiments is that both weights and quantization parameters may be trained during the quantization training for the neural network, which allows the quantization parameters to be adapted to the dynamic range of the network parameters (e.g., weights) for a neural network.

With the above general understanding borne in mind, various embodiments for implementing a neural network are described below. Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or complex programmable logic devices (CPLDs). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
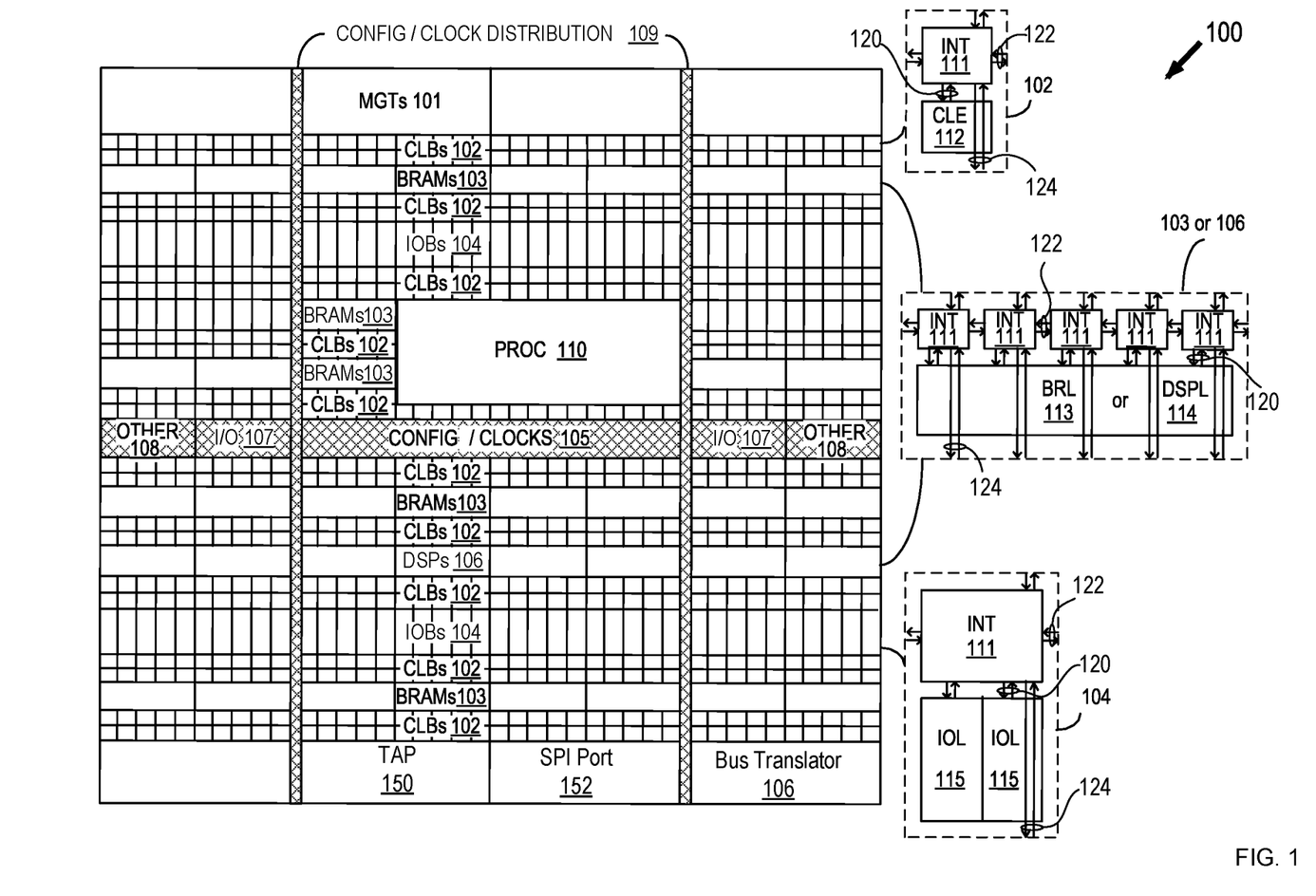
FIG. 1 is a block diagram illustrating an exemplary architecture for an IC according to some embodiments of the present disclosure.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the one or more embodiments described herein is not limited to the exemplary IC depicted in FIG. 1, and that IC having other configurations, or other types of IC, may also implement those embodiments.

As discussed above, machine learning continues to be increasingly pervasive in applications that span the cloud to the edge. Low-precision quantization may be used to enable low power, enhanced throughput implementations and a mechanism for managing memory bandwidth requirements in neural network inference processing. However, this reduced precision leads to reductions in accuracy. Retraining weights with quantization may be used to improve accuracy, however the quantization thresholds are typically fixed after an initial calibration during the retraining. In an example, a linear quantization scheme of n levels between quantization thresholds t1 and t2 defined by $$q(x) = \frac{t2 - t1}{n - 1} \cdot \text{round}\left(\frac{n - 1}{t2 - t1} \cdot (\text{clip}(x, t1, t2) - t1)\right) + t1.$$

Quantization threshold levels t1 and t2 may be learned with an exponential moving average (EMA) of min/max statistics of the floating-point values of the parameters being quantized. However, such a linear quantization scheme requires an extensive number of steps to achieve a good EMA to estimate proper quantization thresholds t1 and t2. Furthermore, such a linear quantization scheme may not adapt the quantization thresholds t1 and t2 during the quantized retraining.

As discussed below with reference to FIGS. 2-8C, a method for neural network training and inference with an improved quantization scheme is described.

Figure 2:
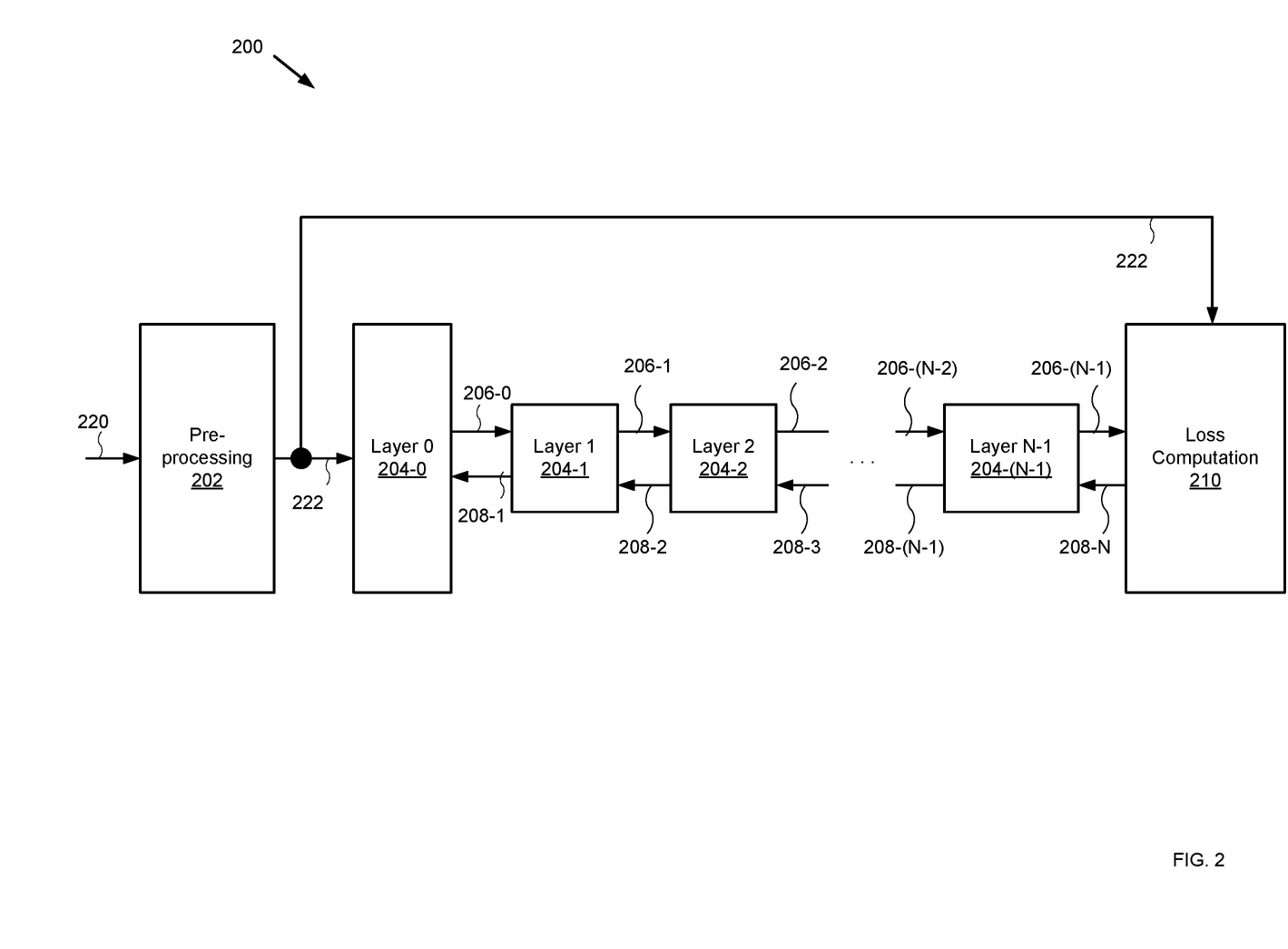
FIG. 2 is a block diagram illustrating an exemplary neural network system according to some embodiments of the present disclosure.

Referring to FIG. 2, illustrated is an exemplary neural network system 200. The neural network system 200 includes a preprocessing unit 202, N layers including layers 204-0 through 204-(N−1), and a loss computation unit 210. The layers may be implemented using programmable logic devices, DSP blocks, etc. In an example, the neural network system 200 including the N layers may be implemented in a single IC. In another example, multiple ICs may be used to implement the neural network system 200, where each IC may implement one or more layers of the neural network system 200. Each layer may include one or more neurons, each neuron having its corresponding forward path processing element (PE) and backward path PE, which will be described in detail below. The first layer 204-0 may receive the input training set, and may be referred to as the input layer 204-0. The input training set may include a sequence of batches having batch indexes 0, 1, 2, 3, . . . , B−1, where B is the number of batches in the input training set. A batch having an index b may be referred to as the $b^{th}$ batch. The last layer 204-(N−1) may provide an output for a corresponding input received by the input layer 204-0, and may be referred to as the output layer 204-(N−1). Layers 204-1 through 204-(N−2) may be referred to as hidden layers.

In some embodiments, a preprocessing unit 202 may receive an input training set 220, artificially augment batches in the input training set 220 (e.g., by performing distorting, shading, rotating, scaling, cropping, and other applicable processes), and generates the preprocessed training set 222 including augmented batches. In some examples, the augmented batch has a size that is greater or equal to that of the corresponding original batch. Such preprocessing may be performed when the data rate of input training set 220 (e.g., images) is unable to fully utilize the computational capabilities of target device(s) implementing the neural network system 200. The data rate of the input training set 220 may be affected by various processes for capturing and providing the input training set 220. For example, it may be affected by the speed of a source capture device (e.g., a camera, a microphone) for capturing the input training set 220 (e.g., images). For further example, it may be affected by a bottleneck caused by an external memory used to provide input training set 220. The preprocessing may be performed when such a data rate of the input training set 220 is lower than a threshold data rate determined based on the computational capabilities of the target device(s). In some examples, after the preprocessing, the preprocessed training set 222 has a larger size than the input training set 220. Such a preprocessed training set 222 with an increased size may improve the quality of the trained neural network (e.g., by improving the generality of models created by the neural network training), and better utilize the computational capabilities of the target device(s) implementing the neural network system.

The neural network system 200 may implement various training algorithms. In some embodiments, the neural network system may use a backpropagation algorithm. Consider a neural network has weights W(b) for the $b^{th}$ batch, and provides an estimation function $f_b(x_i)$ based on the weights W(b), where $x_i$ is an input to be estimated (i.e., an image to be recognized). For such a neural network, the backpropagation algorithm includes two processes, a forward path (forward propagation) process, and a backward path (backward propagation) process.

In some embodiments, a forward path process may include computing activations 206-0 through 206-(N−1) for all layers 204-0 through 204-(N−1). For a preprocessed training set 222 including M samples, the input/output pairs may be denoted as $\{x_i, y_i\}$, where i=0, . . . , M−1. An estimate of an output $\tilde{y}_i$ may be calculated as:

$$\tilde{y}_i = f_b(x_i),$$

where $f_b$ refers to a model described by a given neural network for weights calculated for a given $b^{th}$ batch. The process for calculating the output may include first calculating the activations 206-0 by layer 204-0, passing the activations 206-0 from layer 204-0 to the next layer 204-1, calculating the activations 206-1 by layer 204-1, and so on until the last layer 204-(N−1) calculates activations 206-(N−1). The activations 206-(N−1) may then be sent to a loss computation unit 210.

In some embodiments, the backward path process may include computing gradients 208-N through 208-1. In the example of FIG. 2, after receiving the activations 206-(N−1) from the last layer 204-(N−1), the loss computation unit 210 may use a predetermined loss function to compute gradients 208-N based on the activations 206-(N−1) and the preprocessed training set 222. In an example, the predetermined loss function may be a sub-differential loss function, for example, a squared hinge loss function provided as:

$$l(y) = \max(0, 1 - \tilde{y}_i y_i)^2.$$

The loss computation unit 210 may then send the gradients 208-N to the last layer 204-(N−1). A layer 204-$i$ may use the loss function to calculate its gradients 208-$i$ based on gradients 208-($i$+1) received from the next layer 204-($i$+1) and activations 206-($i$−1) received from the preceding layer 204-($i$−1). The calculated gradients 208-$i$ may then be passed to the preceding layer 204-($i$−1), which may be used to calculate the gradient at each weight by iteratively applying the chain rule, which is a formula for computing the derivative of the composition of two or more functions. Such computation of gradients continues until the gradients of weights in all layers 204-(N−1) to 204-0 have been calculated.

In some embodiments, during the backward path process, gradients of weights may be used to update the weights using a gradient descent algorithm. In an example, in a particular layer, the weight update process may be provided as follows:

$$W(b+1) = W(b) - \mu \text{Grad}(b),$$

where W(b) is the weights for the $b^{th}$ batch, Grad(b) is the gradients for the $b^{th}$ batch, μ is a learning rate or a step size, and W(b+1) are the weights for the $(b+1)^{th}$ batch.

Figure 3:
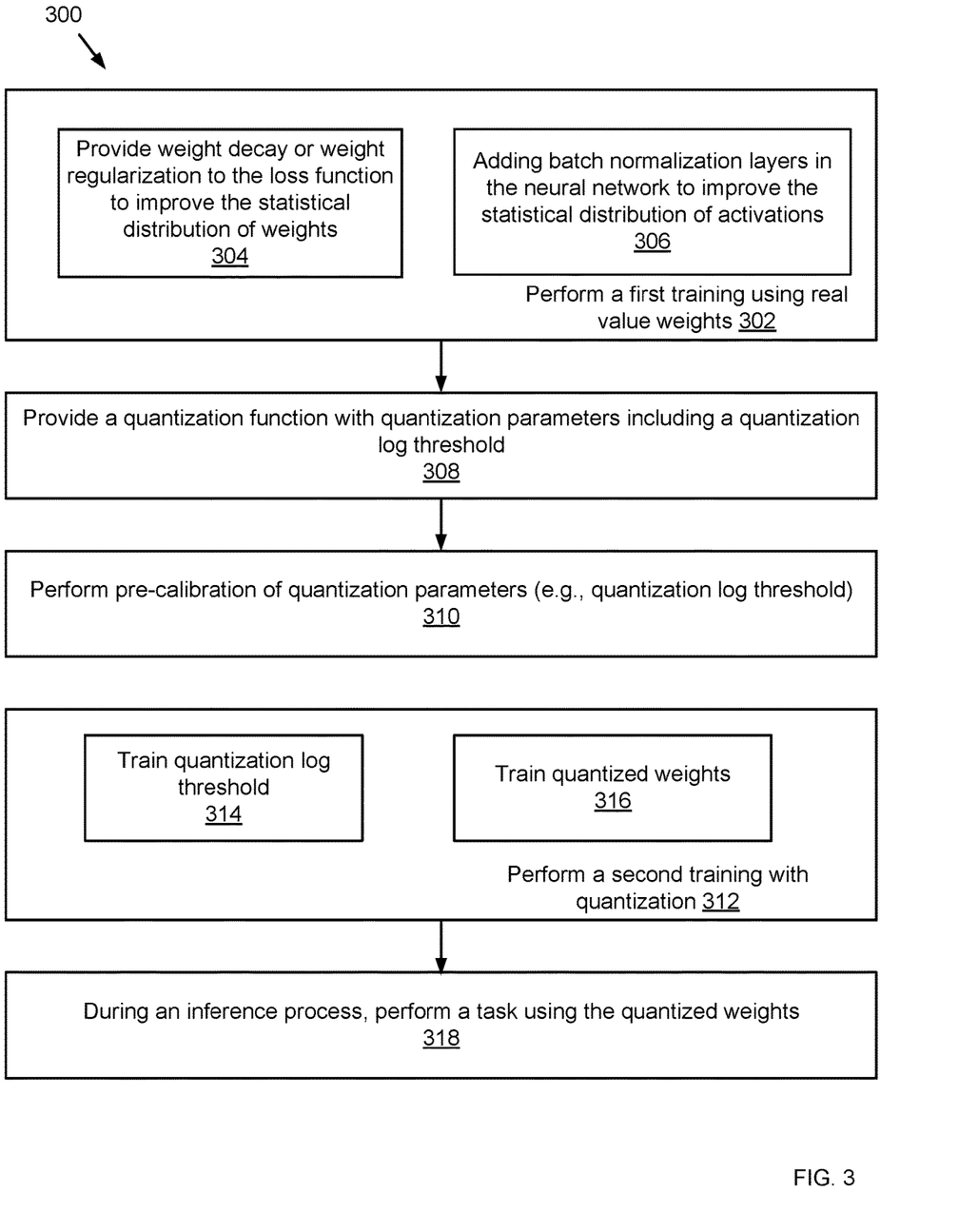
FIG. 3 is a flow diagram of a method for neural network training and inference according to some embodiments of the present disclosure.
Figure 4:
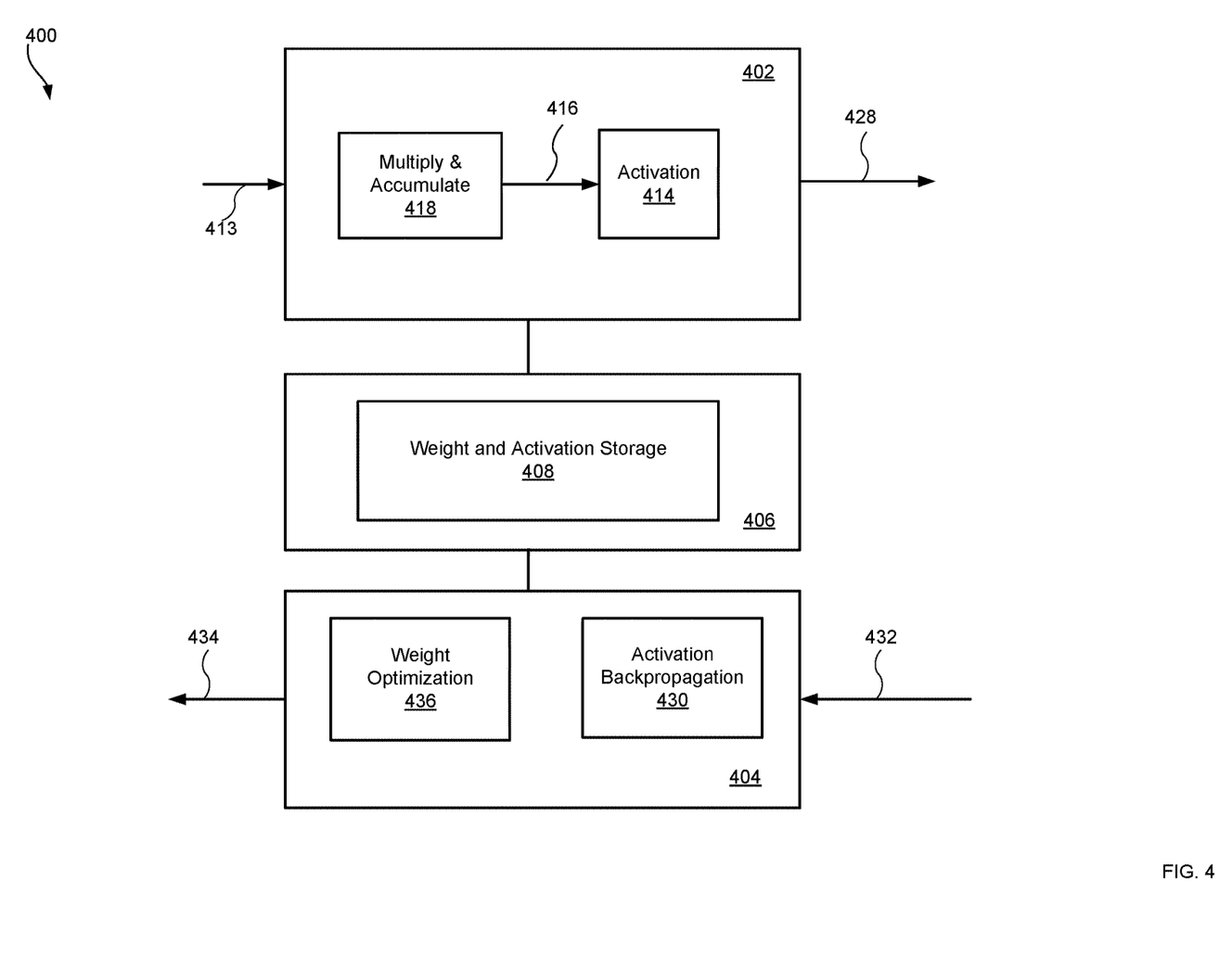
FIG. 4 is a block diagram illustrating a portion of a neural network system according to some embodiments of the present disclosure.

Referring to FIG. 3, a method 300 for neural network training and inference (e.g., using neural network 200 of FIG. 2) is illustrated. Referring to FIGS. 3 and 4, the method 300 begins at block 302, where during a first training process, the neural network is trained with real value weights (e.g., without quantization). In some embodiments, performing such a first training process (e.g., using fixed point hardware design) does not affect the hardware design (e.g., using lower-precision hardware design) for performing an inference process at block 318 using the trained lower-precision neural network (e.g., with quantized weights) as described in detail below. It is noted that while such a first training process may be used to improve accuracy of the neural network, in some embodiments, such a first training process is skipped.

In some embodiments, at block 302, the first training process may use a first training set including a sequence of batches, where each batch is used for an iteration of training. All first-step weights are updated during each batch iteration (e.g., using a backpropagation training method) of the first training process. The first training process 302 may also be referred to as a real-value weights training process 302.

Referring to the example of FIG. 4, illustrated is a layer circuit 400 implementing a layer (e.g., layer 204-$i$) of a neural network 200 during the first training process 302. The layer circuit 400 includes a forward path circuit 402 for performing forward propagation, a backward path circuit 404 for performing backward propagation, and a storage device 406 including a weight and activation storage 408 for storing weights and/or activations.

The forward path circuit 402 includes a multiply and accumulate unit 418 and an activation unit 414. The multiply and accumulate unit 414 receives activations 413 (e.g., activations 206-($i$−1)) from a preceding layer (e.g., layer 204-($i$−1)), receives the weights from the weight and activation storage 408, and generates activations input 416 by performing a multiply and accumulate operation using the weights and the activations. The activation unit input 416 may be sent to the activation unit 414, which generates activations 428 (e.g., activations 206-$i$) based on the activation unit input 416 and the weights from the weight and activation storage 408. The activations 428 may then be provided to an input of the next layer (e.g., layer 204-($i$+1)).

In the example of FIG. 4, the backward path circuit 404 may receive gradients 432 (e.g., from the next layer or a loss function), and generate gradients 434 (e.g., by performing an activation gradient function using an activation backpropagation unit 430). The gradients 434 may be provided to the preceding layer (e.g., layer 204-($i$−1)). The backward path circuit 404 may include a weight optimization unit 436, which may update the weights based on the gradients 434 and store the updated weights in the weight storage device 408. The weight optimization unit 436 may use optimization algorithms including, for example, stochastic gradient descent, batch gradient descent, gradient descent, Adam, and/or any other applicable optimization algorithms.

In the first training process 302, various techniques may be used to improve the statistical distribution of the weights and activations, which may improve the quantization performance of the weights and activations in the second training process 312. For example, the first training process 302 may include a process 304, where weight decay or weight regulation are provided to the loss function to improve the statistical distribution of the weights (e.g., based on a predetermined target statistical distribution of the weights). For further example, the first training process 302 may include a process 306, where batch normalization layers are added to the neural network to improve the statistical distribution of the activations. In an example, batch normalization is implemented by normalizing inputs of each layer of a plurality of layers of the neural network model, such that the output activations have a mean of zero and a standard deviation of one.

Figure 5:
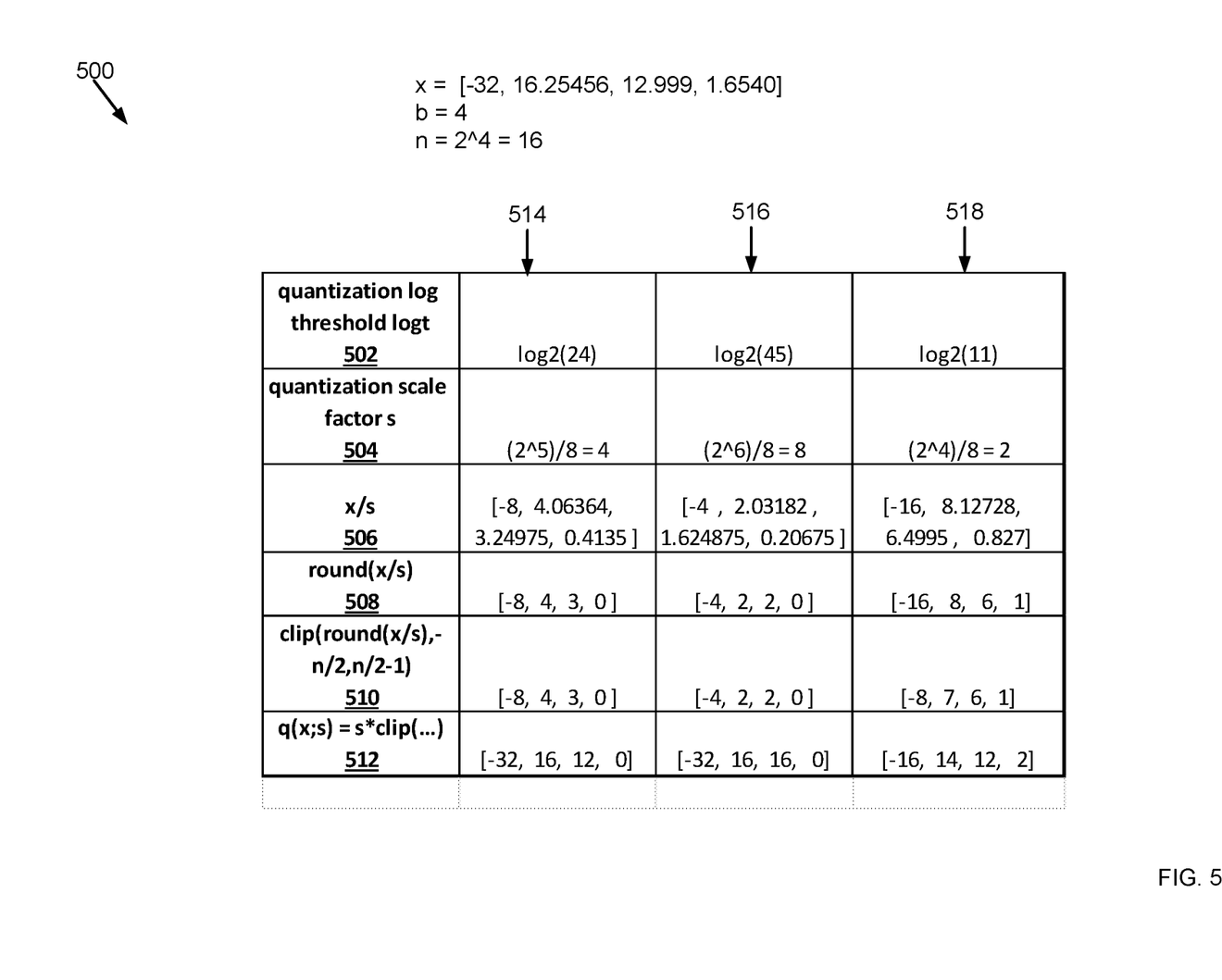
FIG. 5 is a table illustrating quantization values of a quantization function with different quantization log threshold values according to some embodiments of the present disclosure.

Referring to FIGS. 3 and 5, the method 300 may then proceed to block 308, where a quantization function for a second training process (also referred to as a quantized retraining) is provided. The quantization function may include one or more quantization parameters, including, e.g., a quantization log threshold (e.g., clipping threshold represented in the log domain), a quantization scale factor. In an example, a quantization function is provided as follows:

$$q(x; s) = s \cdot \text{clip}\left(\text{round}\left(\frac{x}{s}\right), -\frac{n}{2}, \frac{n}{2} - 1\right), \quad (1)$$

where x is a real input value, and q(x; s) is a quantized output value. The quantization function (1) includes quantization parameters s, n, and log t, where s is a quantization scale factor computed as follows:

$$s = \frac{2^{\text{ceil}(\log t)}}{n/2}, \quad (2)$$

where log t is a quantization log threshold, n is the number of quantization levels in that quantization range, defined as:

$$n = 2^b, \quad (3)$$

where b is the bit width corresponding to the quantized value q.

The quantization function q(x;s) as provided in equation (1) uses a single quantization log threshold log t that defines an even range (e.g., $[-2^{\log t}, 2^{\log t}]$) over which values of a parameter x are quantized. A quantization threshold t may be determined using the quantization log threshold log t as follows: $t = 2^{\log t}$.

In some embodiments, two different log thresholds log t1 and log t2 may be used, which may define a range (e.g. e.g., $[-2^{\log t1}, 2^{\log t2}]$) over which values of a parameter are quantized. In some embodiments, a log base other than 2 (e.g., 10) may also be used, though such embodiments may be less amenable to hardware implementations.

Referring to FIG. 5, illustrated is a table 500 including examples of computation of quantized values using the quantization function (1) for a signed input x with different values for the quantization log threshold log t 502. Specifically, columns 514, 516, and 518 correspond to log t 502 of values $\log_2(24)$, $\log_2(45)$, and $\log_2(11)$ respectively.

In the example of FIG. 5, the signed input x to the quantization function (1) has real values [−32, 16.25456, 12.999, 1.6540], the bit width b for the quantization is 4, and the number of quantization levels n between the quantization range for parameter x is 2^4=16.

In the example of column 514 of the table 500, the quantization log threshold log t 502 has a value of $\log_2(24)$. The quantization scale factor s 504 is computed according to equation (2) and has a value of (2^5)/8=4. The scaled value x/s 506 is [−8, 4.06364, 3.24975, 0.4135], the rounded scaled value 508 (round(x/s)) is [−8, 4, 3, 0]. The clipped rounded scaled value 510 is computed as clip(round(x/s), −8, 7), which is [−8, 4, 3, 0]. As such, the quantized value q(x;s) is [−32, 16, 12, 0].

In the example of column 516 of table 500, the quantization log threshold log t 502 has a value of $\log_2(45)$. The quantization scale factor s 504 is computed according to equation (2) and has a value of (2^6)/8=8. The scaled value x/s 506 is [−4, 2.03182, 1.624875, 0.20675], the rounded scaled value 508 (round(x/s)) is [−4, 2, 2, 0]. The clipped rounded scaled value 510 is computed as clip(round(x/s), −8, 7), which is [−4, 2, 2, 0]. As such, the quantized value q(x;s) is [−32, 16, 16, 0].

In the example of column 518 of table 500, the quantization log threshold log t 502 has a value of $\log_2(11)$. The quantization scale factor s 504 is computed according to equation (2) and has a value of (2^4)/8=2. The scaled value x/s 506 is [−16, 8.12728, 6.4995, 0.827], the rounded scaled value 508 (round(x/s)) is [−16, 8, 6, 1]. The clipped rounded scaled value 510 is computed as clip(round(x/s), −8, 7), which is [−8, 7, 6, 1]. As such, the quantized value q(x;s) is [−16, 14, 12, 2].

It is noted while quantization function (1) is used for a signed input x, similar quantization function using a quantization log threshold may be used for an unsigned input x. For example, for an unsigned input x, the following quantization function may be used:

$$q(x; s) = s \cdot \text{clip}\left(\text{round}\left(\frac{x}{s}\right), 0, n - 1\right), \quad (4)$$

where s is $$s = \frac{2^{\text{ceil}(\log t)}}{n},$$

and n are defined according to equation (3). In some examples, the quantization function for an unsigned input x is used for quantization of activations (e.g., outputs of rectified linear unit (ReLU) activation functions that are positive semidefinite).

The method 300 may proceed to block 310, where a pre-calibration process of the quantization parameters (e.g., the quantization log threshold log t) is performed to provide initial values for the quantization parameters. Compared to uninitialized quantization parameters (e.g., using a constant value), the calibrated quantization parameters improve the performance (e.g., training time, inference accuracy, etc.) of the neural network. Various calibration methods may be used, including, e.g., constant initialization, calibration that minimizes squared error between pre- and post-quantization, calibration that minimizes Kullback-Leibler (KL) divergence between pre- and post-quantization. In an example, the calibration method finds the statistics (e.g., mean=mu, variance=sigma^2) of the weight/activation distribution and chooses thresholds at mu+/−k*sigma for k=2 or 3.

Figure 6:
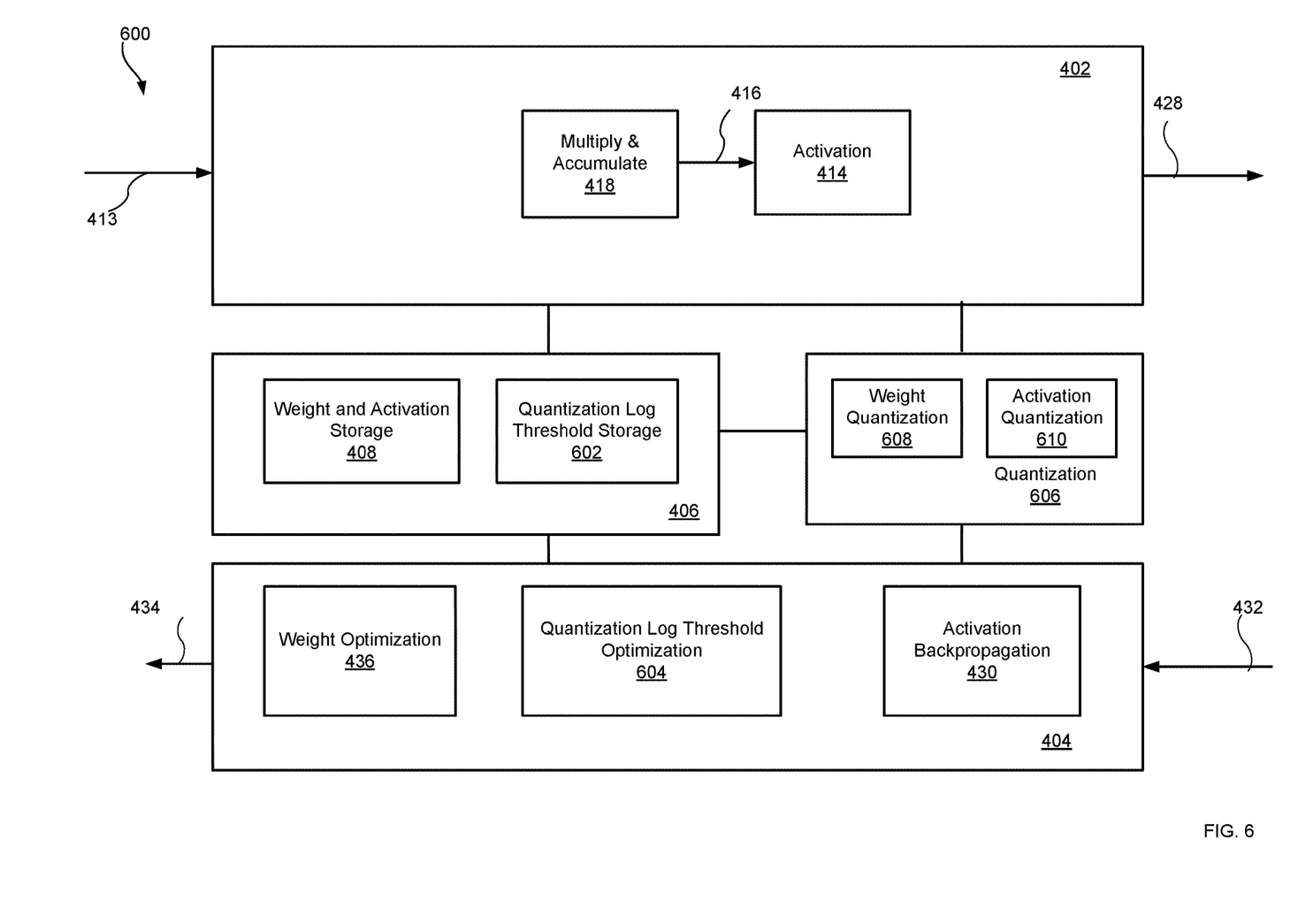
FIG. 6 is a block diagram illustrating a portion of a neural network system according to some embodiments of the present disclosure.

Referring to FIGS. 3 and 6, the method 300 may proceed to block 312 to perform a second training process (e.g., using floating point hardware implementation) to train the neural network with quantized weights based on the quantization function. The second training process 312 includes block 314 for training the quantization log threshold log t, and block 316 for training quantized weights.

Referring to FIG. 6, illustrated is a layer circuit 600 implementing a layer (e.g., layer 204-i) of a neural network 200 during the second training process 312. The layer circuit 600 is substantially similar to the layer circuit 400 of FIG. 4 except the differences discussed below. The layer circuit 600 includes quantization log threshold storage 602 for storing quantization log threshold log t. A quantization unit 606 may retrieve the quantization log threshold log t from the quantization log threshold storage 602, and perform the quantization function (e.g., quantization function (1)) using quantization log threshold log t to generate quantized weights and quantized activations.

In some embodiments, weight quantization unit 608 of the quantization unit 606 receives float point weights from the backward path circuit 404 (e.g., from weight optimization unit 436), applies the quantization function (e.g., quantization function (1)), and generates quantized weights. The weight quantization unit 608 provides the quantized weights to the weight and activation storage 408, which stores the quantized weights. In some examples, the quantized weights are provided (e.g., by the weight quantization unit 608 or the weight and activation storage 408) to the forward path circuit 402 for generating activations 428 for the next training batch. The weight quantization unit 608 provides the quantized weights to the weight and activation storage 408, which stores the quantized weights. In some examples, the quantized weights are provided (e.g., by the weight quantization unit 608 or the weight and activation storage 408) to the forward path circuit 402 for generating activations 428.

In some embodiments, activation quantization unit 610 of the quantization unit 606 performs activation quantization (e.g., using quantization function (1)) to generate quantized activations. For example, the activations unit 414 of forward path circuit 402 generates floating point activations (e.g., based on quantized weights), and sends the floating point activations to activation quantization unit 610. Activation quantization unit 610 applies the quantization function (e.g., quantization function (1)) to the floating point activations, and sends the quantized activations to the forward path circuit 402. The forward path circuit 402 provides the quantized activations as the activations 428.

At block 314, quantization log threshold optimization unit 604 of the backward path circuit 404 may use a quantization log threshold optimizer to train the quantization log threshold log t. In an example, using a straight-through estimator (e.g., by passing the gradient through quantization functions as if taking the gradient with respect to a straight unquantized line), the gradient of the quantization function with respect to the quantization log threshold log t is provided as follows:

$$\nabla_{\log t} q = \frac{\partial q(x; s)}{\partial \log t} = s(\ln 2) \cdot \begin{cases} \text{round}\left(\frac{x}{s}\right) - \frac{x}{s}, & -\frac{n}{2} \leq \text{round}\left(\frac{x}{s}\right) < \frac{n}{2} \\ \frac{n}{2} \text{sgn}(x), & \text{else} \end{cases} \quad (5)$$

To train quantization log threshold log t during quantized retraining 312, the quantization log threshold optimizer may apply the gradient descent as follows:

$$\log t := \log t - \alpha \cdot \nabla_{\log t} q, \quad (6)$$

where α is a learning rate or a step size.

The quantization log threshold optimizer may be used to generate an optimized quantization log threshold log t. Referring to the examples of FIG. 5, the quantization log threshold optimizer may determine that the quantization log threshold log t (e.g., $\log_2(24)$) of column 514 is more optimal that the quantization log threshold log t (e.g., $\log_2(45)$, $\log_2(11)$) of columns 516 and 518, because the quantized values q(x;s) 512 are closer to the input values x. Compared to column 514, column 516 includes a quantization log threshold log t of $\log_2(45)$, which is greater than that of column 514. As shown by the quantized values q(x;s) 512, while column 516 has a higher dynamic range, it loses precision between quantized levels. On the other hand, compared to column 514, column 518 includes a quantization log threshold log t of $\log_2(11)$, which is less than that of column 514. As shown by the quantized values q(x;s) 512, while column 518 provides higher precision between quantized levels, it loses the dynamic range and values get saturated. By using the quantization log threshold optimizer, the quantization log threshold log t (hence the scale factor s according to equation (2)) is trained using backward propagation and gradient descent, which provides a more optimal quantization function compared to using a fixed value (e.g., a statistical choice) for a quantization threshold in a quantization function.

At block 316, weight optimization unit 436 of the backward path circuit 404 may update the weights based on the gradients 434, and generate updated weights that are floating point. The weight quantization unit 608 of the quantization unit 606 may perform quantization to the floating point updated weights to generate quantized updated weights, and store the quantized updated weights in the weight and activation storage 408.

In some embodiments, each of the weight optimization unit 436 and quantization log threshold optimization unit 604 may use various optimization algorithms including, for example, stochastic gradient descent (SGD), batch gradient descent, gradient descent, Adam, momentum SGD, AdaDelta, RMSProp, and/or any other applicable optimization algorithms. The learning rates and decay schedules may be tuned separately for the optimization algorithms for weight optimization and quantization log threshold optimization. In some embodiments, the weight optimization and quantization log threshold optimization are performed to optimize the same objective function (e.g., the loss function). In alternative embodiments, the weight optimization and quantization log threshold optimization are performed to optimize different objective functions.

In some embodiments, blocks 314 and 316 are performed simultaneously in each iteration of the second training 312. In those embodiments, in each iteration of the second training 312, the weights and the quantization log thresholds are trained simultaneously to find and gradients and performing gradient descent. In alternative embodiments, blocks 314 and 316 are performed separately and/or alternatively in separate iterations. For example, during a plurality of iterations of the second training 312, the weights are trained by gradient descent in some iterations (e.g., the odd iterations) only, and the quantization log thresholds are separately trained in other iterations (e.g., the even iterations).

The method 300 may proceed to block 318, where during an inference process, a task is performed (e.g., using lower-precision hardware design) using the neural network model with the quantized weights. In an example, after the second training process 312 is completed, the real-value weights are discarded, and only the quantized weights are maintained in the weight storage device 408. During the inference process, only the forward path (e.g., using the forward path circuit 402 of FIG. 6) is used. Using the neural network model with quantized weights of reduced precision improves the inference process by enabling implementations with lower power, enhanced throughput, and reduced memory bandwidth requirements.

Figure 7A:
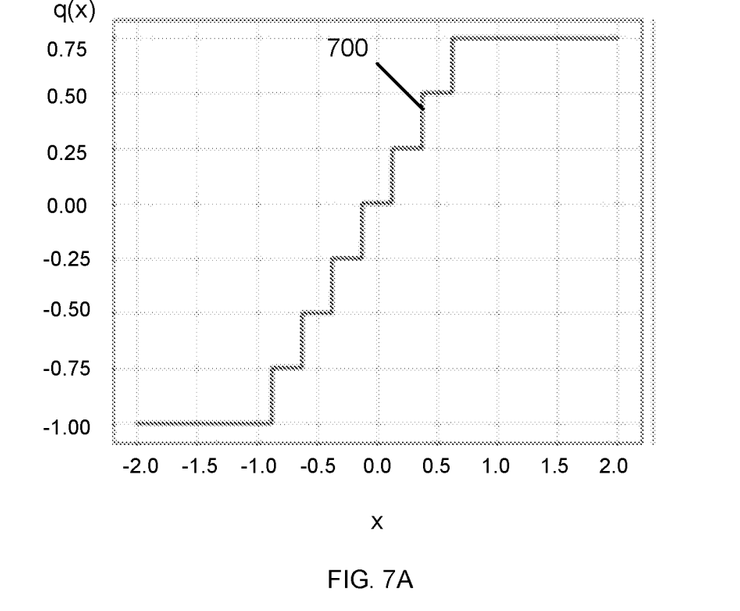
FIG. 7A is a diagram illustrating a curve of an output of a quantization function over an input of the quantization function.
Figure 7B:
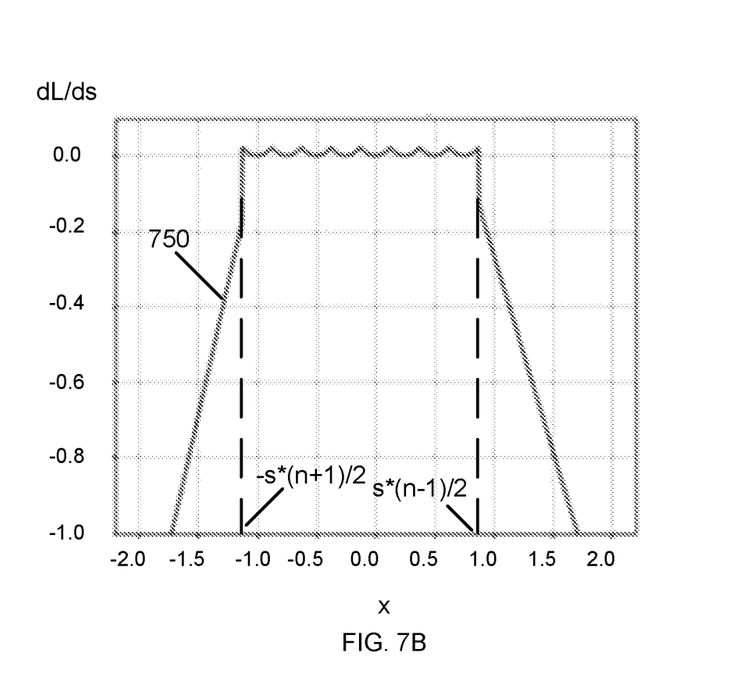
FIG. 7B is a diagram illustrating a corresponding curve of a gradient of loss with respect to quantization scale factor over the input value.

Referring to the examples of FIGS. 7A and 7B, illustrated are curves related to a quantization function. FIG. 7A includes a curve 700 illustrating an output of a quantization function q(x) (e.g., using equation (1)) over the input value x. FIG. 7B is a diagram illustrating a corresponding curve 750 of a gradient of loss with respect to quantization scale factor (dL/ds) over the input value x. The loss L may be determined using any suitable loss function (e.g., a cross entropy loss function). An example loss L includes a squared loss computed as follows:

$$L=(q(x)-x)^2.$$

As shown in curve 750, during the optimization, when many values of the input x being quantized are outside the range $[-s^*(n+1)/2, s^*(n-1)/2]$ (e.g., $[-9/8, 7/8]$ where n=8 and s=¼), the gradient dL/ds is negative. This causes the quantization log threshold to increase. When many values of the input x being quantized are within the range $[-s^*(n+1)/2, s^*(n-1)/2]$, including for example where the loss L indicating the highest quantization error, the gradient dL/ds is positive, causing the quantization log threshold to decrease.

Figure 8A:
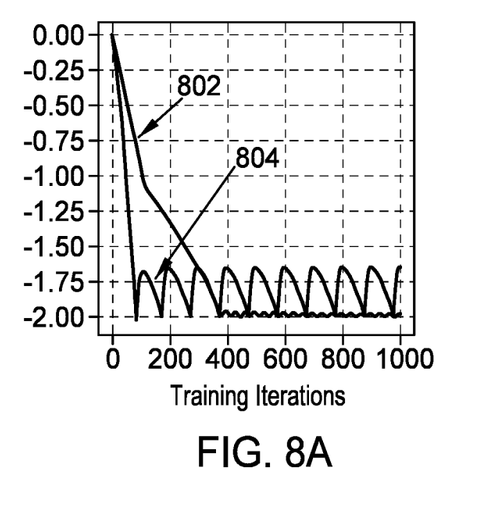
FIGS. 8A, 8B, and 8C illustrate a comparison of quantization log threshold training process and non-log-domain quantization threshold training process for inputs having distributions of different variances.
Figure 8B:
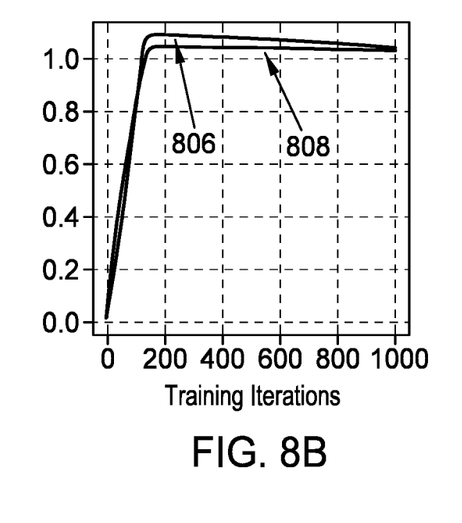
Figure 8C:
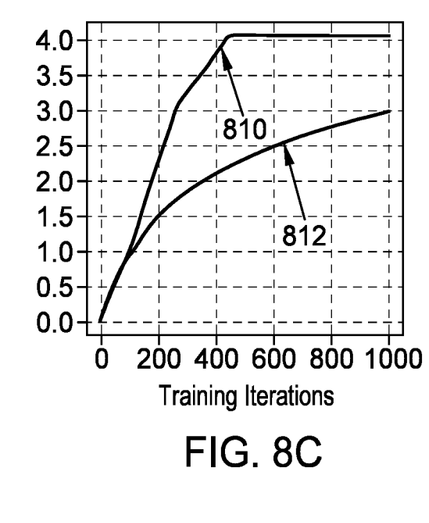

Referring to FIGS. 8A, 8B, and 8C, learned quantization log thresholds by training over quantization function inputs x with distributions of different variances are illustrated. As shown in FIGS. 8A-8C, by using quantization log thresholds, convergence to an optimal log t is more consistent over input data with distributions having different variances. FIG. 8A includes curve 802, which illustrates the learned quantization log threshold log t versus the training iterations (also referred to as training steps) where the input data (e.g., weight, activation) distribution has a standard deviation of 0.1. Curve 804 corresponds to the log value of a learned straight quantization threshold t versus the training iterations. FIG. 8B includes curve 806, which illustrates the learned quantization log threshold log t versus the training iterations where the input data distribution has a standard deviation of 1.0. Curve 808 corresponds to the log value of a learned straight quantization threshold t. FIG. 8C includes curve 810, which illustrates the learned quantization log threshold log t versus the training iterations where the input data distribution has a standard deviation of 10.0. Curve 812 corresponds to a learned straight quantization threshold t.

As shown in curves 804, 808, and 812, for training using straight quantization thresholds t, the variance of the input data (e.g., weight, activation) distribution makes a big difference in how quickly the quantization threshold t trains. As shown in curve 804, for the input data distribution having small variances (e.g., less than 1.0), learning of the straight quantization threshold t is quick to converge, but may be unstable. Additionally, if the variance is too small, a single gradient update may bring the threshold t to a non-positive value, which results in a runtime error. As shown in curve 812, for the input data distribution having larger variances (e.g., greater than 1.0), the learning is slow to converge.

As shown in curves 802, 806, and 810, by training the quantization log threshold log t, the number of training iterations for convergence are consistent (e.g., around 400, 200, 400 training iterations respectively) for input data with distributions having different variances. In other words, the number of training iterations/training time are independent of the underlying input data (e.g., weights, activations) distribution. Furthermore, by training the quantization log threshold log t, the risk of runtime error is eliminated. As such, compared to training standard quantization thresholds, training the quantization log thresholds is advantageous when the dynamic range (the range of representable numbers) of data (e.g., weight, activation) in a neural network model is large.

It is noted that various configurations illustrated in FIGS. 2-8C are exemplary only and not intended to be limiting beyond what is specifically recited in the claims that follow. It will be understood by those skilled in that art that other configurations may be used based on the training and inference requirements of the neural network model. In an example, the quantized retraining may perform the training of the quantization log threshold with initial quantization log threshold values with calibration or without calibration. Furthermore, while the examples are described using quantization for signed inputs, similar implementations may be used for unsigned inputs.

One or more elements in the various embodiments may be implemented by software, hardware (e.g., an application specific integrated circuit (ASIC), a logic on a programmable logic IC (e.g., FPGA)), firmware, and/or a combination thereof. The embodiments may be implemented using various hardware resources, such as for example DSP slices, BRAM, and programmable resources of an FPGA; however, in other embodiments, digital signal processors, microprocessors, multi-core processors, memory, and/or other hardware may be used. When implemented in software, the elements of the embodiments of the invention are essentially the code segments to perform the necessary tasks. The program or code segments can be stored in a processor-readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read-only memory (ROM), a flash memory, an erasable programmable read-only memory (EPROM); a floppy diskette, a CD-ROM, an optical disk, a hard disk, or other storage device, The code segments may be downloaded via computer networks such as the Internet, Intranet, etc.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A system, comprising:
a non-transitory memory; and
one or more hardware processors coupled to the non-transitory memory and configured to read instructions from the non-transitory memory to cause the system to perform operations comprising:
providing a quantization function including a quantization log threshold parameter comprising a log value of a quantization threshold;
performing a quantization training to a neural network model, wherein the quantization training includes:
performing a first optimization process to generate an updated quantization log threshold parameter of the quantization function;
generating quantized neural network parameters for the neural network model based on the quantization function with the updated quantization log threshold parameter; and
providing the neural network model with the quantized neural network parameters for performing a task.

2. The system of claim 1, wherein the first optimization process includes:
using a gradient descent to generate the updated quantization log threshold parameter.

3. The system of claim 1, wherein the quantization training includes:
performing a second optimization process to generate the quantized neural network parameters.

4. The system of claim 3, wherein the quantization training includes a plurality of iterations, and
wherein during each iteration, the first optimization process and the second optimization process are performed.

5. The system of claim 3, wherein the quantization training includes a plurality of iterations,
wherein the first optimization process is performed only in each of a first set of the plurality of iterations, and
wherein the second optimization process is performed only in each of a second set of the plurality of iterations.

6. The system of claim 1, wherein the operations further comprise:
performing a pre-calibration process to generate an initial calibrated value for the quantization log threshold parameter; and
performing the first optimization process with the initial calibrated value for the quantization log threshold parameter.

7. The system of claim 6, wherein the pre-calibration process includes a constant initialization process, a calibration process that minimizes squared error between pre- and post-quantization, or a calibration process that minimizes Kullback-Leibler (KL) divergence between pre- and post-quantization.

8. The system of claim 1, wherein the operations further comprise:
performing a float point training to the neural network model to train the quantized neural network parameters prior to the quantization training.

9. The system of claim 8, wherein performing the float point training includes:
performing batch normalization by normalizing inputs of each layer of a plurality of layers of the neural network model.

10. The system of claim 1, wherein generating the quantized neural network parameters comprises:
scaling input data using the quantization log threshold parameter.

11. A method, comprising:
providing a quantization function including a quantization log threshold parameter comprising a log value of a quantization threshold;
performing a quantization training to a neural network model, wherein the quantization training includes:
performing a first optimization process to generate an updated quantization log threshold parameter; and
generating quantized neural network parameters based on the quantization function with the updated quantization log threshold parameter; and
providing the neural network model with the quantized neural network parameters for performing a task.

12. The method of claim 11, wherein the first optimization process includes:
using a gradient descent to generate the updated quantization log threshold parameter.

13. The method of claim 11, wherein the quantization training includes:
performing a second optimization process to generate the quantized neural network parameters.

14. The method of claim 13, wherein the quantization training includes a plurality of iterations, and
wherein during each iteration, the first optimization process and the second optimization process are performed.

15. The method of claim 13, wherein the quantization training includes a plurality of iterations,
wherein the first optimization process is performed only in each of a first set of the plurality of iterations, and
wherein the second optimization process is performed only in each of a second set of the plurality of iterations.

16. The method of claim 11, further comprising:
performing a pre-calibration process to generate an initial calibrated value for the quantization log threshold parameter; and
performing the first optimization process with the initial calibrated value for the quantization log threshold parameter.

17. The method of claim 16, wherein the pre-calibration process includes a constant initialization process, a calibration process that minimizes squared error between pre- and post-quantization, or a calibration process that minimizes Kullback-Leibler (KL) divergence between pre- and post-quantization.

18. The method of claim 11, further comprising:
performing a float point training to the neural network model to train the quantized neural network parameters prior to the quantization training.

19. The method of claim 18, wherein performing the float point training includes:
performing batch normalization by normalizing inputs of each layer of a plurality of layers of the neural network model.

20. The method of claim 11, wherein the task includes a natural language processing task or an image classification task.

* * * * *